(12) United States Patent
Sakamoto et al.

(10) Patent No.: US 7,990,501 B2
(45) Date of Patent: Aug. 2, 2011

(54) TRANSFLECTIVE TYPE LCD AND METHOD FOR MANUFACTURING THE SAME

(75) Inventors: Michiaki Sakamoto, Tokyo (JP); Satoshi Ihida, Tokyo (JP); Hidenori Ikeno, Tokyo (JP); Masaki Shinohara, Tokyo (JP); Shigeru Kimura, Tokyo (JP); Kenji Morio, Tokyo (JP); Kazurou Saeki, Tokyo (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 0 days.

(21) Appl. No.: 12/905,793

(22) Filed: Oct. 15, 2010

(65) Prior Publication Data

US 2011/0027460 A1 Feb. 3, 2011

Related U.S. Application Data

(62) Division of application No. 11/009,029, filed on Dec. 13, 2004, now Pat. No. 7,817,229, which is a division of application No. 10/205,365, filed on Jul. 26, 2002, now Pat. No. 6,853,421.

(30) Foreign Application Priority Data

Aug. 6, 2001 (JP) ................................. 2001-237887

(51) Int. Cl.
 *G02F 1/1335* (2006.01)
(52) U.S. Cl. .......................... 349/114; 349/113; 349/187
(58) Field of Classification Search .................. 349/113, 349/114, 187
 See application file for complete search history.

(56) References Cited

U.S. PATENT DOCUMENTS

| 6,169,593 | B1 | 1/2001 | Kanaya et al. |
| 6,195,140 | B1 | 2/2001 | Kubo et al. |
| 6,211,992 | B1 | 4/2001 | Van Aerie et al. |
| 6,330,047 | B1 | 12/2001 | Kubo et al. |
| 6,380,995 | B1 | 4/2002 | Kim |
| 6,407,790 | B1 | 6/2002 | Chen |
| 6,628,357 | B1 | 9/2003 | Maeda et al. |
| 7,106,400 | B1 | 9/2006 | Tsuda et al. |
| 2001/0002050 | A1 | 5/2001 | Kobayashi et al. |

(Continued)

FOREIGN PATENT DOCUMENTS

EP 0 811 892 A1 12/1999

(Continued)

OTHER PUBLICATIONS

Chinese Office Action dated Mar. 26, 2004 with English translation.

(Continued)

*Primary Examiner* — Michael H Caley
(74) *Attorney, Agent, or Firm* — McGinn IP Law Group, PLLC

(57) ABSTRACT

A method for manufacturing a transflective type LCD having a first substrate provided thereon with a plurality of scanning lines and a plurality of signal lines which are substantially perpendicular to each other and a switching element arranged near each of intersections between said scanning lines and said signal lines, includes forming a reflection region having a reflection electrode film and a transmission region having a transparent electrode film in each pixel surrounded by said scanning lines and said signal lines, a liquid crystal being sandwiched at a gap between said first substrate and a second substrate which is arranged opposite to said first substrate, and forming an organic film having irregularities thereon below said reflection electrode film and said transparent electrode film to substantially the same film thickness.

1 Claim, 16 Drawing Sheets

U.S. PATENT DOCUMENTS

| | | |
|---|---|---|
| 2001/0045560 A1 | 11/2001 | Bijlsma |
| 2002/0021403 A1 | 2/2002 | Kim et al. |

FOREIGN PATENT DOCUMENTS

| | | |
|---|---|---|
| EP | 1 113 308 A1 | 7/2001 |
| EP | 1 255 154 A2 | 11/2002 |
| JP | 11-101992 A | 4/1999 |
| JP | 11-281992 | 10/1999 |
| JP | 2000-75305 | 3/2000 |
| JP | 2000-148042 | 5/2000 |
| JP | 2000-250025 A | 9/2000 |
| JP | 2000-258762 A | 9/2000 |
| JP | 2001-33768 | 2/2001 |
| JP | 2001-42355 | 2/2001 |
| JP | 2001-132744 | 4/2001 |
| JP | 2001-188112 | 7/2001 |
| KR | 2001 0065037 | 7/2001 |

OTHER PUBLICATIONS

European Search Report dated Nov. 8, 2002.
European Search Reported dated Feb. 3, 2003.
Japanese Office Action dated Jun. 27, 2006 with English translation.

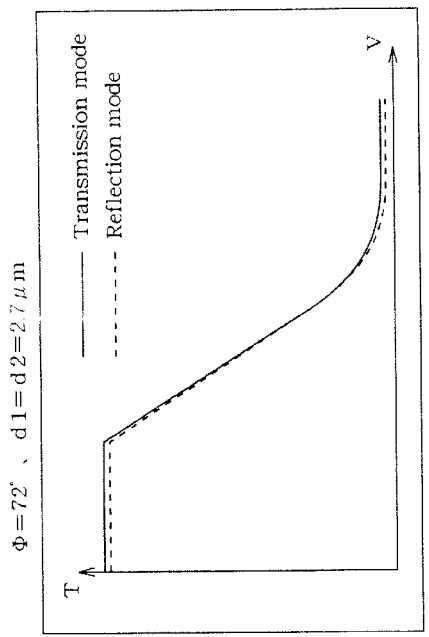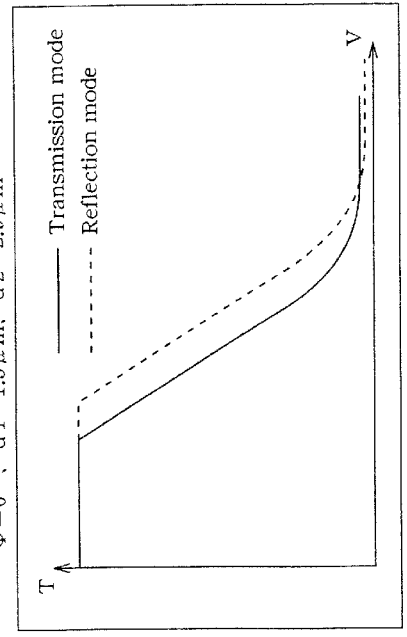
FIG.5(a) Φ=72°, d1=d2=2.7μm
FIG.5(b) Φ=0°, d1=1.5μm, d2=2.9μm

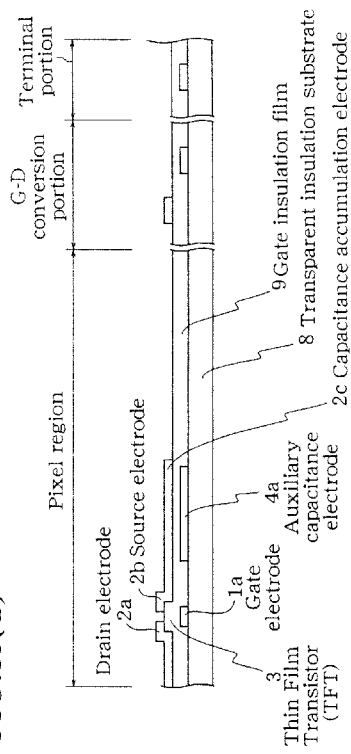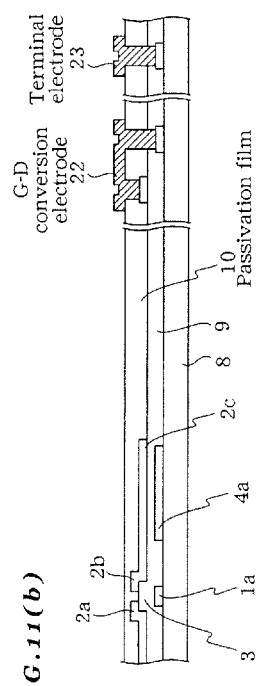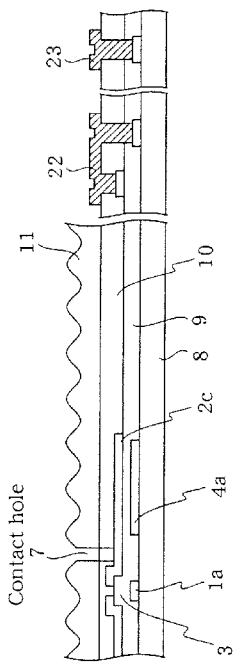
FIG.11(a)
FIG.11(b)
FIG.11(c)

TRANSFLECTIVE TYPE LCD AND METHOD FOR MANUFACTURING THE SAME

RELATED APPLICATIONS

The Application is a Divisional Application of U.S. patent application Ser. No. 11/009,029, filed on Dec. 13, 2004, 2008 now U.S. Pat. No. 7,817,229, which was a Divisional Application of U.S. patent application Ser. No. 10/205,365 filed Jul. 26, 2002, (Now U.S. Pat. No. 6,853,421 B2).

BACKGROUND OF THE INVENTION

1. Field of the Invention

The present invention relates to a Liquid Crystal Display (LCD) and method for manufacturing the same and, more particularly to, a transflective active-matrix type LCD having a transmission region and a reflection region in its pixel and method for manufacturing the same.

2. Description of the Related Art

Because of its features of a small and thin geometry and low power consumption, an LCD has been put to practical use in a variety of applications such as an OA apparatus and a portable apparatus. The LCDs are classified in a transmission type and a reflection type, the LCD of the transmission type of which has no function to emit light for itself unlike a CRT or an EL display and so is provided with a back-light source separately so that display may be controlled by transmitting/blocking the back-light of liquid crystal thereof.

Although the transmission type LCD can use back-light to obtain bright display independently of the surrounding environments, a back-light source thereof typically has large power consumption of substantially a half of the total consumption thereof, thus contributing to an increase in the overall power consumption. If the LCD is driven by a battery in particular, its operating time is decreased, while if a large sized battery is mounted thereto on the other hand, its total weight is increased, thus preventing improvements in size and weight thereof.

To solve this problem owing to large power consumption of the back-light source, a reflection type LCD is suggested which utilizes surrounding light for display. The reflection type LCD employs a reflecting plate in place of the back-light source to transmit/block the surrounding light reflected by the reflecting plate in order to control display, so that it need not have a back-light source, to thereby reduce its power consumption, size, and weight; at the same time, however, it is largely deteriorated in visibility problematically if the surroundings are dark.

Although the transmission type and reflection type LCDs have these advantages and disadvantages of their own, a back-light source is required in order to obtain stable display but inevitably increases power consumption of the LCDs if only it is used as the light source thereof. To solve this problem, for example, Japanese Patent Application (KOKOKU) Laid-Open No. Hei 11-101992 discloses a transflective type LCD which can suppress power consumption of its back-light source and secure visibility independently of the surrounding environments, in which a transmission region and reflection region are provided in each pixel thereof to enable providing transmission mode display and reflection mode display on a single liquid crystal panel.

A conventional transflective type LCD is described as follows with reference to FIG. 18. FIG. 18 is a cross sectional view of conventional transflective type LCD.

As shown in FIG. 18, the conventional transflective type LCD comprises an active matrix substrate 12 on which a switching element such as a Thin Film Transistor (hereinafter abbreviated as TFT) 3 is formed, an opposing substrate 16 on which a color filter, a black matrix, etc. are formed, a liquid crystal layer 17 sandwiched by these substrates, and a back-light source 18 arranged below the active matrix substrate 12.

On the active matrix substrate 12 is provided with a gate line and a data line and, near an intersection thereof, a TFT 3, in such a configuration that a drain electrode 2a and a source electrode 2b of the TFT3 are connected to the data line and a pixel electrode respectively. Each pixel is divided into a transmission region which transmits back-light and a reflection region which reflects surrounding light in such a construction that the transmission region has a transparent electrode film 5 formed on a passivation film 10 and the reflection region has a reflection electrode film 6 made of metal on an irregular film 11 made of an organic substance.

In this construction of the transflective type LCD, in the transmission region, back-light radiated from a back side of the active matrix substrate 12 passes through the liquid crystal layer 17 and is emitted from the opposing substrate 16, while in the reflection region, surrounding light injected through the opposing substrate 16 once enters the liquid crystal layer 17 and is reflected by the reflection electrode film 6 and passes back through the liquid crystal layer 17 and then is emitted from the opposing substrate, so that there occurs a difference in optical path length between the transmission region and the reflection region.

To guard against this, conventionally, a polarization state of the emitted light has been adjusted so as to equalize the optical path lengths of the liquid crystal layer 17 in these two regions to each other by forming the organic irregular film 11 in the reflection region thicker than that in the other so that the gap of the liquid crystal layer 17 in the reflection region may be substantially a half of that in the transmission region.

Generally, the gradation-luminance characteristics of the liquid crystal panels need to be the same in the transmission region and the reflection regions so that an image impression in the transmission mode may match that in the reflection mode. For this purpose, the voltage-luminance characteristics (V-T) of the panel in the transmission mode may agree with those in the reflection mode.

In the above-mentioned conventional transflective type LCD, however, a gap of the liquid crystal layer 17 is different in the reflection region and the transmission region, that is, the gap with respect to the electrode is different on the side of the active matrix substrate 12 and on the side of the opposing substrate 16, so that the strength of an electric field applied on the liquid crystal cannot be equal in the various regions, to result in a change in luminance in these regions, thus problematically deteriorating the display quality.

SUMMARY OF THE INVENTION

In view of the above, it is a main object of the present invention to provide a transflective type LCD and method for manufacturing the same which can match the voltage-luminance characteristics of the panel in the transmission mode with those in the reflection mode and also which can suppress occurrence of a pixel defect caused by a reflection electrode film or a transparent electrode film.

In order to achieve above mentioned object, a transflective type LCD according to present invention comprising: a plurality of scanning lines and a plurality of signal lines which are substantially perpendicular to each other and a switching element arranged near each of intersections between said scanning lines and said signal lines on a first substrate; a transmission region in which a transparent electrode film is formed and a reflection region in which a reflection electrode film is formed which regions are provided in each pixel surrounded by said scanning lines and said signal lines; and liquid crystal sandwiched at a gap between said first substrate and a second substrate which is arranged opposite to said first substrate, wherein an organic film below said reflection electrode film which underlies irregularities of said reflection electrode film is formed also below said transparent electrode film as shaped irregular with almost the same film thickness so that said gap may be substantially equal both in said transmission region and said reflection region.

Moreover, in the transflective type LCD, wherein said reflection electrode film is formed on the side of the pixel where said switching element is arranged, so that a terminal of said switching element is connected with said reflection electrode film via a through hole formed in said organic film and said transparent electrode film is connected with said reflection electrode film in an overlap region thereof.

Moreover, in the transflective type LCD, wherein such a portion (G-D conversion portion) as to lead out said signal line by means of a gate layer is connected with either one of said reflection electrode film and said transparent electrode film in a circumference of said first substrate.

Moreover, in the transflective type LCD, wherein: on such a side of each of said first substrate and said second substrate as to be opposite to the sides thereof which sandwich said liquid crystal therebetween, a $\lambda/4$ plates and a polarizing plates are arranged in this order from the side of said substrate; said polarizing plate on an outer side of said first substrate and said polarizing plate on an outer side of said second substrate are arranged so that polarization axes thereof may be perpendicular to each other; and a twist angle of said liquid crystal is set at 72 degree.

Moreover, a method for manufacturing a transflective type LCD according to the present invention, in said transflective type LCD having a first substrate provided thereon with a plurality of scanning lines and a plurality of signal lines which are substantially perpendicular to each other and a switching element arranged near each of intersections between said scanning lines and said signal lines, forming a reflection region having a reflection electrode film and a transmission region having a transparent electrode film in each pixel surrounded by said scanning lines and said signal lines and the liquid crystal is sandwiched at a gap between said first substrate and a second substrate which is arranged opposite to said first substrate, the method comprising the steps of: when forming an organic film having irregularities thereon is formed below said reflection electrode film and said transparent electrode film to substantially the same film thickness, forming a half-tone mask having a transmission portion, a shielding portion and a transflective portion in said pixel portion; and forming said irregularities and a portion where said organic film is completely removed using the said mask at a same time.

Moreover, in a method for manufacturing a transflective type LCD according to the present invention, in said transflective type LCD having a first substrate provided thereon with a plurality of scanning lines and a plurality of signal lines which are substantially perpendicular to each other and a switching element arranged near each of intersections between said scanning lines and said signal lines, forming a reflection region having a reflection electrode film and a transmission region having a transparent electrode film in each pixel surrounded by said scanning lines and said signal lines and the liquid crystal is sandwiched at a gap between said first substrate and a second substrate which is arranged opposite to said first substrate, the method comprising the steps of: when forming an organic film having irregularities thereon is formed below said reflection electrode film and said transparent electrode film to substantially the same film thickness, forming a first organic film as scattered in dot; performing predetermined heat treatment to form protrusions; and covering moderately by a second organic film to form said predetermined irregularities.

Moreover, in the method of present invention, wherein when forming a window portion for said transmission portion by removing a part of said reflection electrode film, etching said reflection electrode film so as to overlap with said transmission electrode film by a predetermined width around an overall periphery of said window portion as viewed from a direction of a normal line of said substrate, and it is preferably said etching is performed so that said width for overlapping may be about 2 μm.

Moreover, in the method of present invention, wherein said reflection electrode film is of a two-layer construction consisting of a barrier metal film and a reflection metal film, each of which is formed to a film thickness at least 100 nm, more preferably about 200 nm or more.

Moreover, in the method of present invention, wherein when at least one of said barrier metal film and said reflection metal film is formed, the metal film is once formed to a predetermined film thickness, then washed by an alkali solution, and then formed again to a desired film thickness.

Moreover, in the method of present invention, wherein Mo is used as a material of said barrier metal film and Al is used as a material of said reflection metal film.

Moreover, in the method of present invention, wherein at the washing step by use of UV ray prior to formation of said transparent electrode film, an application quantity of the UV ray is limited down to a value less than 100 mJ.

Moreover, a method for manufacturing a transflective type active matrix substrate according to present invention, said transflective type active matrix substrate being provided with a plurality of scanning lines and a plurality of signal lines which are substantially perpendicular to each other and a switching element arranged near each of intersections between said scanning lines and said signal lines in such a configuration that a reflection region having a reflection electrode film and a transmission region having a transparent electrode film are formed in each pixel surrounded by said scanning lines and said signal lines, the method comprising at least the steps of: depositing a passivation film on a substrate on which said scanning lines, said signal lines, and said switching elements are formed and then forming a first contact hole in a portion (G-D conversion portion) which is provided around said substrate to lead out said signal line by means of a gate layer; filling said first contact hole with a predetermined conductive material to connect said G-D conversion portion therewith; depositing an organic film to almost the same film thickness both in said transmission region and said reflection region, then forming irregularities on the surface and also removing said organic film on a terminal of said switching element to form a second contact hole; forming a transparent electrode film on said organic film in said transmission region; and forming a reflection electrode film in such a manner that said reflection electrode film may overlap with said transparent electrode film around an overall periphery thereof by a predetermined width to interconnect said terminal and said reflection electrode film through said second contact hole.

Moreover, a method for manufacturing a transflective type active matrix substrate, said transflective type active matrix substrate being provided with a plurality of scanning lines and a plurality of signal lines which are substantially perpendicular to each other and a switching element arranged near each of intersections between said scanning lines and said signal lines in such a configuration that a reflection region having a reflection electrode film and a transmission region having a transparent electrode film are formed in each pixel surrounded by said scanning line and said signal line, the method comprising at least the steps of: depositing a passivation film on a substrate on which said scanning lines, said signal lines, and said switching elements are formed and then forming a first contact hole in a portion (G-D conversion portion) which is provided around said substrate to lead out said signal line by means of a gate layer; depositing an organic film to almost the same film thickness both in said transmission region and said reflection region, then forming irregularities on the surface and also removing said organic film on a terminal of said switching element to form a second contact hole; forming a transparent electrode film on said organic film in said transmission region and also filling said first contact hole with said transparent electrode film to connect said G-D conversion portion therewith; and forming a reflection electrode film in such a manner that said reflection electrode film may overlap with said transparent electrode film around an overall periphery thereof by a predetermined width to interconnect said terminal and said reflection electrode film through said second contact hole.

In an configuration according to the present invention, the gap of the liquid crystal layer can be substantially equal in the transmission region and the reflection region so that the V-T characteristics in the transmission mode may agree with those in the reflection mode; also, by improving an adhesiveness of the transparent electrode film to protect the edge of the transparent electrode film securely, it is possible to suppress a defect from occurring owing to a developer during the PR (photo resist) step for forming the reflection electrode film.

BRIEF DESCRIPTION OF THE DRAWINGS

FIG. 5 are graphs for showing V-T characteristics at predetermined twist angle as well as the gap in the transmission and reflection regions of the liquid crystal;

FIG. 11 are cross-sectional flow diagrams for showing a transflective type LCD manufacturing method related to a fourth embodiment of the present invention;

DESCRIPTION OF THE PREFERRED EMBODIMENTS

The following will describe preferred embodiments of a transflective type LCD related to the present invention with reference to drawings.

As mentioned above, generally in a transflective type LCD, the gradation-luminance characteristics of an LCD panel must be the same at a transmission section and a reflection section so that an image impression in the transmission mode may match that in the reflection mode. For this purpose, the voltage-luminance characteristics (V-T characteristics) of the panel in the transmission mode must agree with those in the reflection mode.

Figure 16:
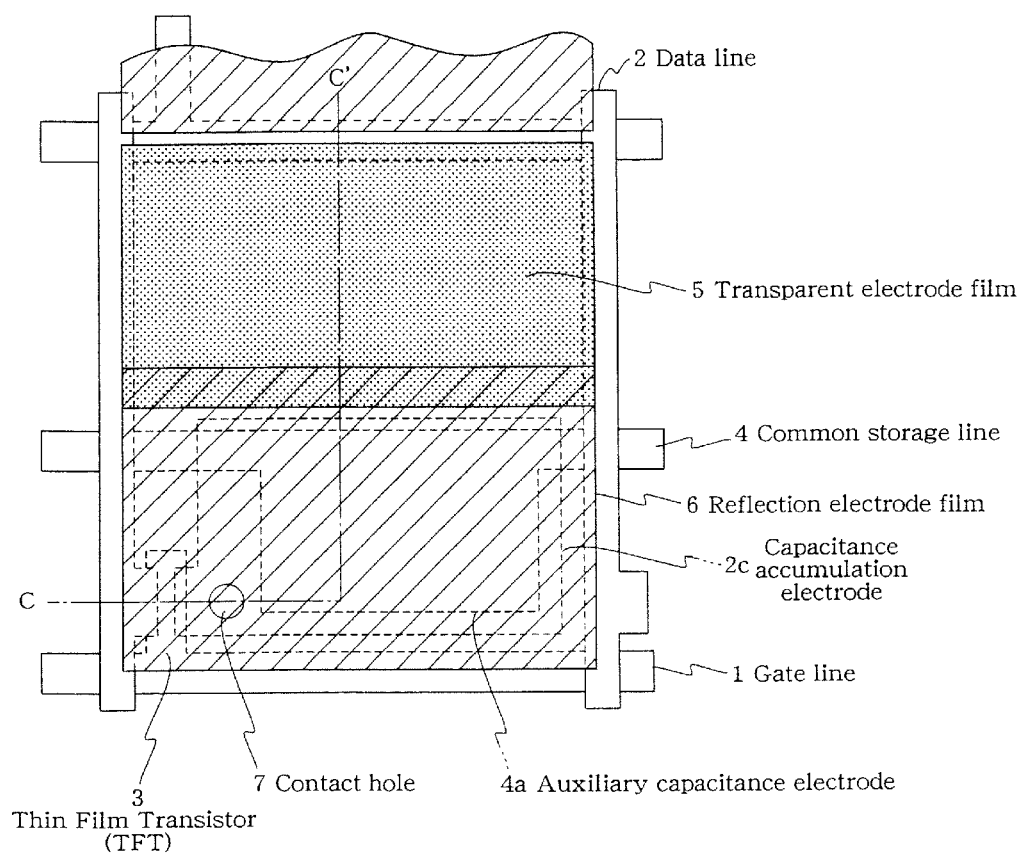
FIG. 16 is a plan view for showing a construction of the transflective type LCD related to a prior application of the present inventor.

To this end, the present inventor proposes in a prior application (Japanese Patent Application No. 2001-132744) a transflective type LCD which has an insulation film with a predetermined film thickness not only in a reflection region but also in a transmission region so that these two regions may have almost the same gap of a liquid crystal layer and also which has polarization adjustment means comprised of a polarization plate and a phase difference plate on both sides of the liquid crystal panel to adjust optical characteristics of these optical members and a twist angle of liquid crystal employed, thus realizing good display. Prior to describing the present patent application, technologies related to this prior application are described with reference to FIGS. 16 and 17. FIG. 16 is a plan view for showing a construction of the active matrix substrate of transflective type LCD related to a prior application. And FIG. 17 shows a cross-sectional view of line c-c' of FIG. 16.

Figure 17:
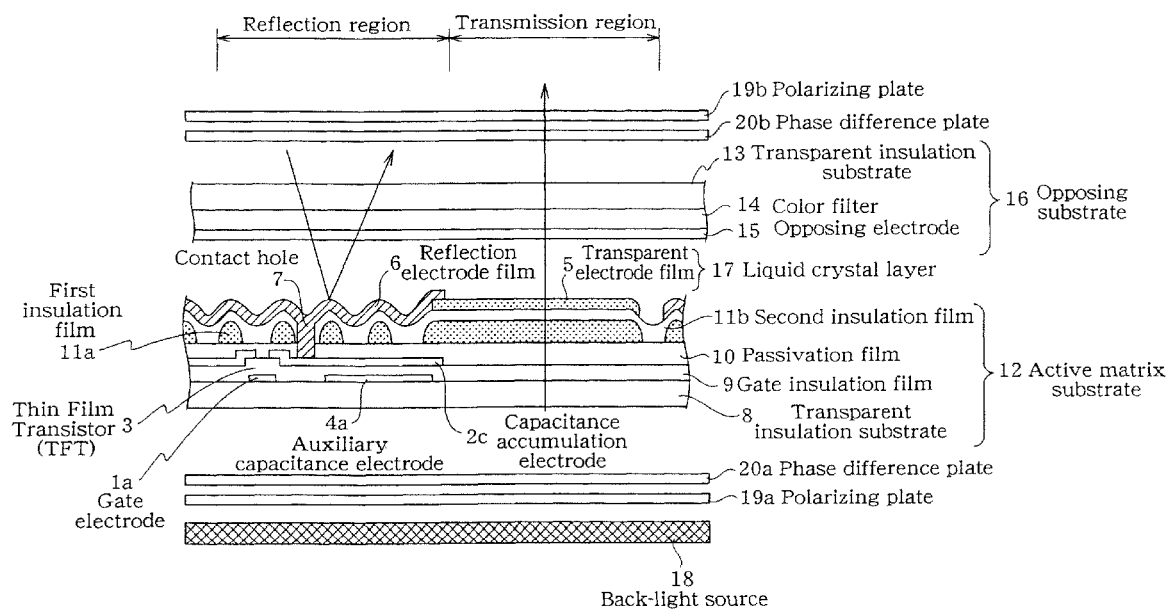
FIG. 17 is a cross-sectional view for showing the construction of the transflective type LCD related to the prior application of the present inventor.
Figure 18:
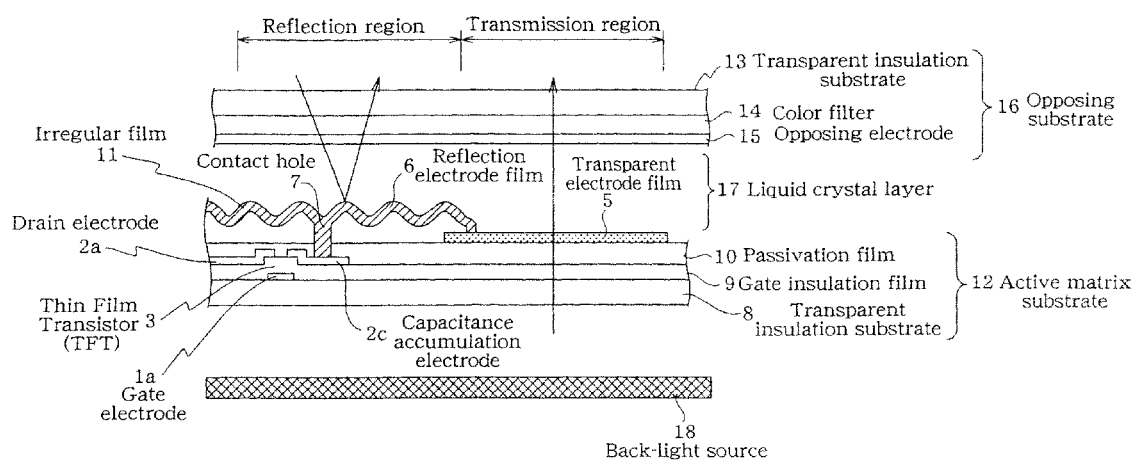
FIG. 18 is a cross-sectional view for showing a construction of the conventional transflective type LCD.

As shown in FIGS. 16 and 17, the transflective type LCD related to the above-mentioned prior application comprises an active matrix substrate 12, an opposing substrate 16, a liquid crystal layer 17 sandwiched by these substrates, a back-light source 18 arranged below the active matrix substrate 12, and a plurality of phase difference plates 20a and 20b as well as polarization plates 19a and 19b respectively arranged on the outer sides of the active matrix substrate 12 and the opposing substrate 16.

The active matrix substrate 12 further comprises a gate line 1, a gate electrode 1a, a common storage line 4, and an auxiliary capacitance electrode 4a which are formed on a transparent insulation substrate 8, a semiconductor layer, a data line 2, a source/drain electrode, and a capacitance accumulation electrode 2c which are formed via a gate insulation film 9, a passivation film 10 covering these, a first insulation film 11a formed as scattered on the passivation film 10, a second insulation film 11b which fills a gap between the first insulation films to thereby form appropriate irregularities, a reflection electrode film 6 formed on the second insulation film 11b, and a transparent electrode film 5 formed so as to partially overlap with the reflection electrode film 6 on the second insulation film 11b.

The first insulation film 11a is formed in the reflection region as scattered in dot and flat in the transmission region, and depend on the surface shape of the first insulation film 11a, the reflection electrode film 6 may be shaped irregularly on the second insulation film 11b in the reflection region and that the transparent electrode film 5 may be formed flat on the second insulation film 11b in the transmission region.

In this configuration, by appropriately setting such optical characteristics of each position as an arrangement angle of the phase difference plates 20a and 20b and a polarization angle of the polarization plates 19a and 19b which plates are all arranged on the outer sides of the both active matrix substrate and the opposing substrate, a rubbing angle of these two substrates, a twist angle of the liquid crystal, a gap of the liquid crystal layer 17, etc., it is possible to remove a residual retardation and compensate for a phase difference within wide band, thus obtaining a high contrast ratio.

In the above-mentioned prior application, however, when the first insulation film 11a is formed as scattered in dot in the reflection region and then heat treated under predetermined conditions to thereby form a desired protrusion shape, the pattern shape of the insulation film 11a before heat treatment is different in the transmission region and the reflection region, so that after heat treatment the first insulation film 11a becomes thinner in the reflection region and thicker in the transmission region, thus giving rise to a delicate difference in gap of the liquid crystal layer 17 between these regions.

Further, as shown in FIG. 16, the reflection electrode film 6 is formed in such a manner as to overlap with the transparent electrode film 5 at the center of each pixel, whereas at a boundary between the adjacent pixels (for example, on the gate line 1 at the upper part in the figure) these two electrodes do not overlap with each other, so that during a photolithography (PR) step for forming the reflection electrode film 6, a developer soaks into the reflection electrode film 5 through its crack at an edge of the transparent electrode film 5 to trigger electric erosion between Al of the reflection electrode film 6 and ITO of the transparent electrode film 5, thus possibly eroding the Al or ITO substances.

Further, when the opposing electrode 15 is connected with an electrode pad on the side of the active matrix substrate 12 using a conductive seal, the conductive seal is arranged over a leader wiring, so that to prevent short-circuiting from occurring near a sealing region on the outer side of the liquid crystal, preferably the data line 2 is connected with a gate layer so that the gate layer may provide a leader (hereinafter called G-D conversion). For this purpose, the G-D conversion needs to be performed by interconnecting the gate and the drain metal at their upper layer metal to reduce the contact resistance, thus establishing a process for manufacturing the product with a smaller number of PR steps while suppressing electric erosion between the above-mentioned AL and ITO substances.

To this end, the present invention proposes such a transflective type LCD structure and method for manufacturing the same that can provide the same gap both in the transmission region and the reflection regions so that their V-T characteristics may agree with each other and also that can suppress electric erosion from occurring between the reflection electrode film 6 and the transparent electrode film 5. The following will describe the contents in detail with reference to the drawings.

First Embodiment

Figure 1:
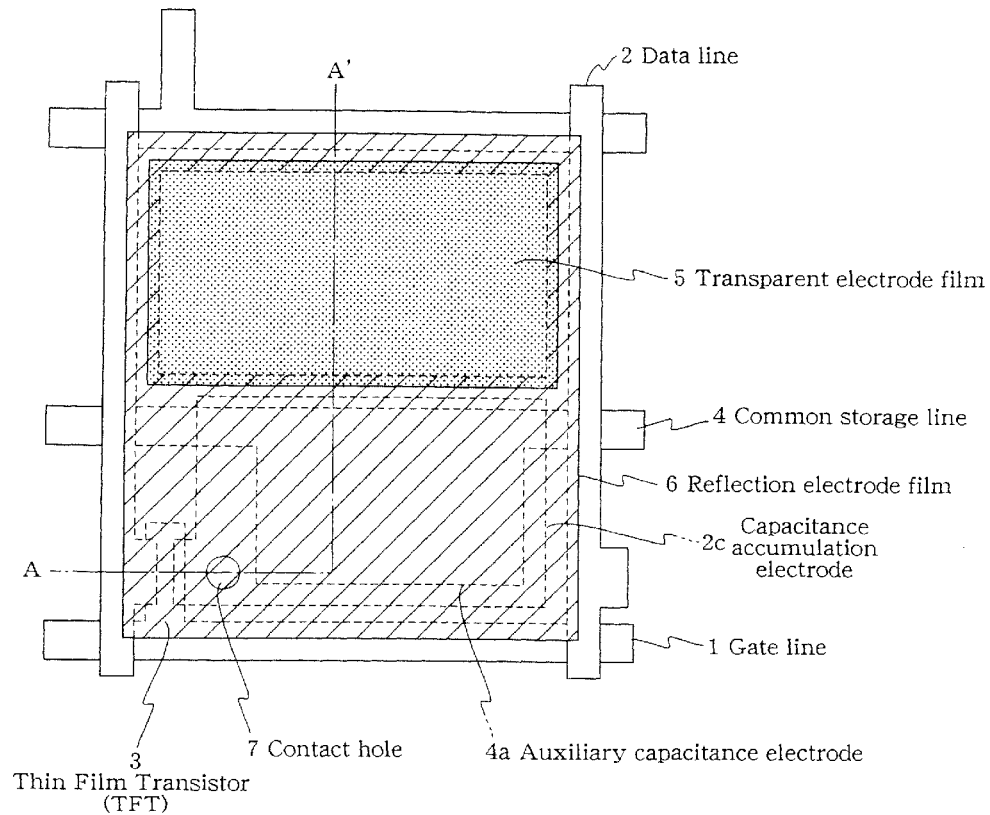
FIG. 1 is a plan view for showing a configuration of a transflective type LCD related to a first embodiment of the present invention.
Figure 2:
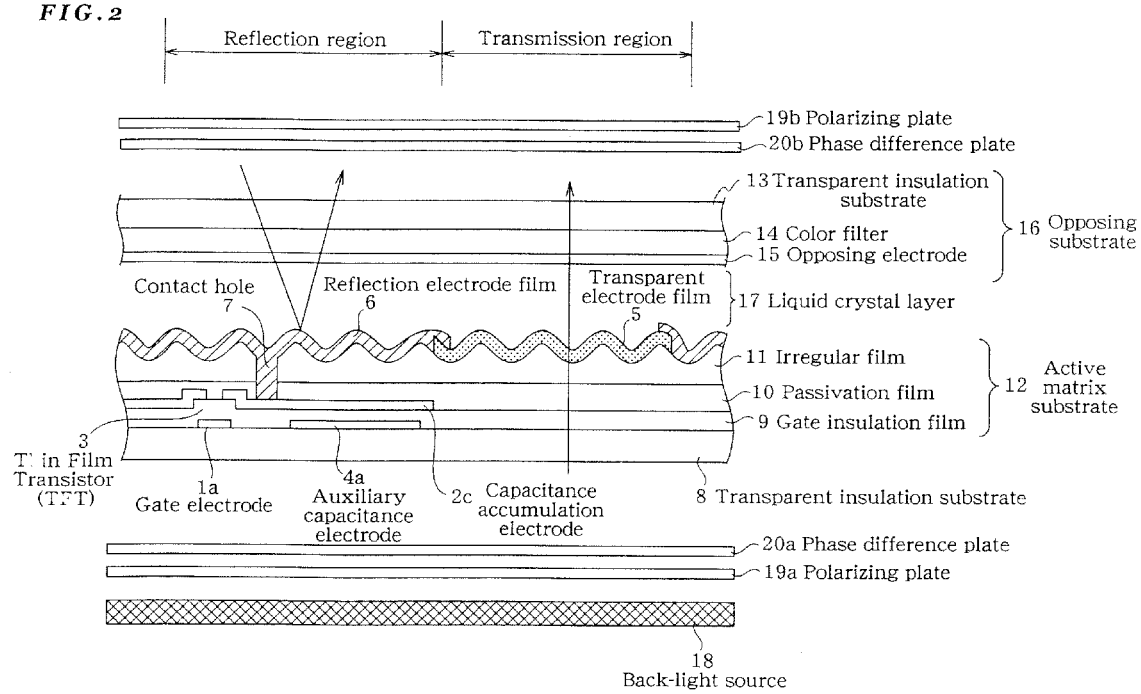
FIG. 2 is a cross-sectional view for showing the configuration of the transflective type LCD related to the first embodiment of the present invention.
Figure 3:
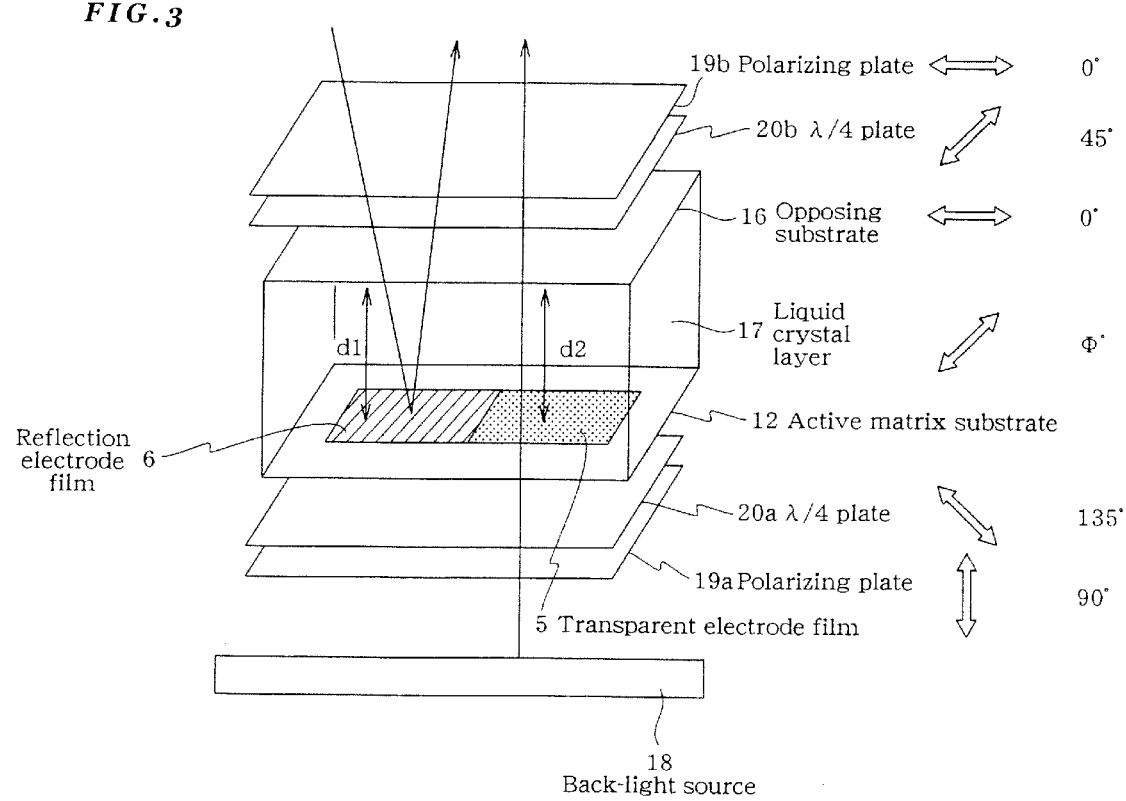
FIG. 3 is an illustration for showing a polarization state of incident light and reflected light of the transflective type LCD related to the first embodiment of the present invention.
Figure 4:
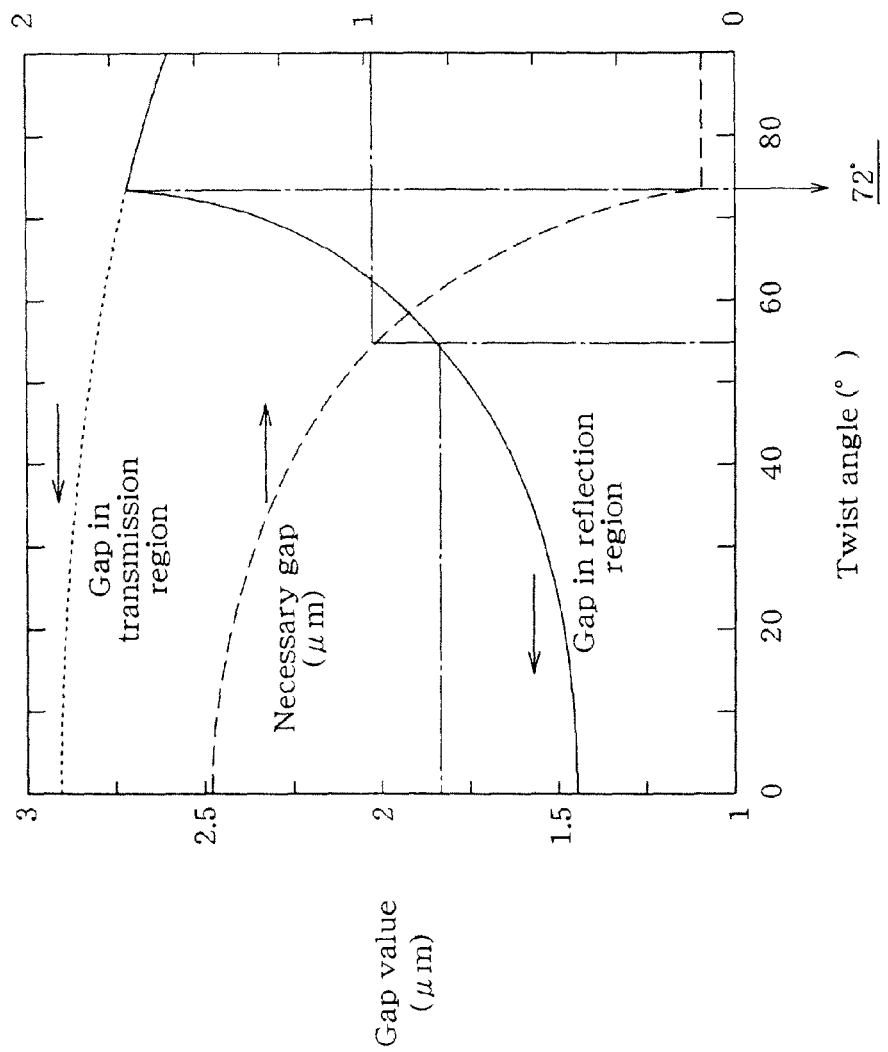
FIG. 4 is a graph for showing a relationship between a twist angle and a gap in a transmission region and a reflection region of liquid crystal.

The following will describe a structure and a principle of the transflective type LCD related to the first embodiment of the present invention with reference to FIGS. 1-5. FIG. 1 is a plan view for showing a configuration of a transflective type LCD related to a first embodiment of the present invention, and FIG. 2 is a cross-sectional view in A-A' line of FIG. 1. FIG. 3 is an illustration for showing a polarization state in each position of the transflective type LCD related to the first embodiment of the present invention, and FIG. 4 is a graph for showing a relationship between a twist angle and a gap. FIG. 5 are graphs for showing V-T characteristics under predetermined condition. Note here that the present embodiment features that an irregular film is formed also in the transmission region as in the reflection region in order to provide the same gap in these regions.

As shown in FIGS. 1 and 2, the transflective type LCD of the present embodiment comprises the active matrix substrate 12, the opposing substrate 16, the liquid crystal layer 17 sandwiched by these substrates, the back-light source 18 arranged below the active matrix substrate 12, and the phase difference plates 20a and 20b as well as the polarizing plates 19a and 19b respectively arranged on the outer sides of the active matrix substrate 12 and the opposing substrate 16.

The active matrix substrate 12 further comprises the gate line 1, the gate electrode 1a, the common storage line 4, the auxiliary capacitance electrode 4a, the gate insulation film 9, the semiconductor layer, the data line 2, the source/drain electrode, and the capacitance accumulation electrode 2c which are formed on the transparent insulation substrate 8 and, on the passivation film 10 covering these, the same shaped irregular film 11 in both the transmission and reflection regions. Further, in the transmission region is formed the transparent electrode film 5 made of ITO etc., while in the reflection region is formed the reflection electrode film 6 made of metal such as Al/Mo. Thus, the reflection region and the transmission regions have the irregular film 11 with the same shape formed therein and so have almost the same height (specifically with a difference in height of 1 μm or less), thus giving almost the same gap of the liquid crystal layer 17 in themselves.

The following will describe, with reference to FIGS. 3-5, the arrangement of the polarizing plates and the phase difference plates on the outer sides of the two substrates and the setting of the twist angle of the liquid crystal and then meanings why the reflection and transmission regions should have almost the same gap.

[Arrangement of Polarization Plate and λ/4 Plate on the Upper Side]

To provide a normally-white state of the reflection region, that is, a state where it looks white when the liquid crystal is laid with no voltage applied between the opposing substrate and the pixel electrode and it looks black when the liquid crystal is erected, the phase difference plate (λ/4 plate) 20b is arranged between the liquid crystal layer 17 and the polarizing plate 19b. By then turning the λ/4 plate 20b by 45 degree with respect to the optical axis of the polarizing plate 19b and sandwiching it therebetween, linear-polarized (horizontal) light passing through the polarizing plate 19b is transformed into clockwise circular-polarized light. This clockwise circular-polarized light arrives at the reflection electrode film 6 as linear-polarized light by setting a gap d1 at a predetermined value. The linear-polarized light is reflected by the reflection electrode film 6 as linear-polarized light, which in turn goes out of the liquid crystal layer 17 as clockwise circular-polarized light. This circular-polarized light is transformed by the λ/4 plate 20b into linear-polarized (horizontal) light and then goes out of the polarizing plate 19b having the horizontal optical axis, thus giving white display.

If a voltage is applied on the liquid crystal layer 17, on the other hand, the liquid crystal is erected. In this state, light injected to the liquid crystal layer 17 as circular-polarized clockwise arrives at the reflection electrode film 6 as clockwise circular-polarized light, which in turn is reflected by the reflection electrode film 6 as counterclockwise circular-polarized light. It is ejected from the liquid crystal layer 17 as circular-polarized counterclockwise and transformed into linear-polarized (vertical) light by the λ/4 plate 20b and absorbed in it without being ejected therefrom. Thus, display appears black.

[Arrangement of λ/4 Plate and Polarizing Plate on the Lower Side]

In the transmission mode, arrangement angles of the optical axes of the λ/4 plate 20a and the polarizing plate 19a on the lower side are determined so that display may appear black with a voltage applied on the liquid crystal. The lower side polarizing plate 19a is arranged in a crossed Nicols manner, that is, as turned by 90 degree with respect to the upper side polarizing plate 19b. Further, in order to cancel (compensate for) an influence by the upper side λ/4 plate 20b, the lower side λ/4 plate 20a is also arranged as turned by 90 degree. Since the liquid crystal is erected when a voltage is applied thereon, the light is unchanged in polarization state, so that essentially it is optically equal to a state where the polarizing plates 19a and 19b are arranged in the crossed Nicols manner, thus providing black display with a voltage applied. Thus, the arrangement of the optical members of the transflective liquid crystal panel and the arrangement angles of their optical axes are determined.

FIG. 4 shows respective gaps d1 and d2 of the reflection region and the transmission region which are optimal to maximize of reflectivity and transmittivity of a white color when the optical members are arranged at the above-mentioned arrangement angles and the twist angle φ of the liquid crystal is changed over 0-90 degree. FIG. 4 indicates that the optimal gap of the transmission region is the same as that of the reflection region at a liquid crystal twist angle of 72° and also that as the liquid crystal twist angle decreases, the optimal gap of the reflection region becomes smaller than that of the transmission region.

Based on these, the present inventor employed nematic liquid crystal with Δn (refractive index anisotropy)=0.086 and, from FIG. 4, set such conditions that the gap value d1=d2=2.7 μm and the twist angle is 72 degree. The voltage-luminance characteristics (V-T characteristics) of the panel in the transmission and reflection modes under these conditions are shown in FIG. 5A. FIG. 5B shows as a comparison example the V-T characteristics under the conventional conditions (twist angle is 0°, d1=1.5 μm, and d2=2.7 μm).

FIG. 5 show that in the configuration of the present embodiment the V-T characteristics of the transmission mode agree well with those of the reflection mode and also the irregular films 11 can be formed in the same shape throughout the surface of the pixel region to provide almost the same gap of the liquid crystal as well as almost the same V-T characteristics both in the reflection and transmission regions, thus improving the display quality.

Although in the present embodiment the irregular films 11 having the same shape have been formed not only in the reflection region but also in the transmission region, the irregular films 11 may not be the same in shape as far as the reflection and the transmission regions have substantially the same gap. For example, in the configuration of the above-mentioned prior application the first insulation film may be formed in two steps so as to be a little thicker in the reflection region where it is scattered in dot taking into account a change in shape of thereof, thus providing almost the same total film thickness including the thickness of the second insulation film in these two regions.

Second Embodiment

Figure 6:
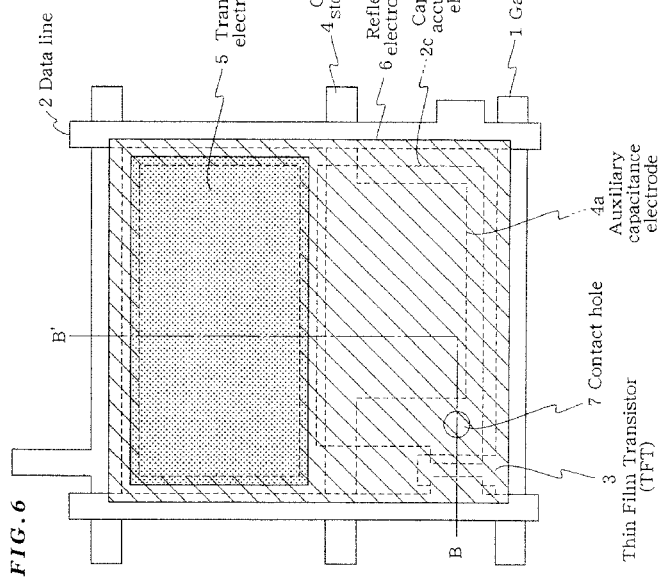
FIG. 6 is a plan view for showing a configuration of the transflective type LCD related to a second embodiment of the present invention.
Figure 7:
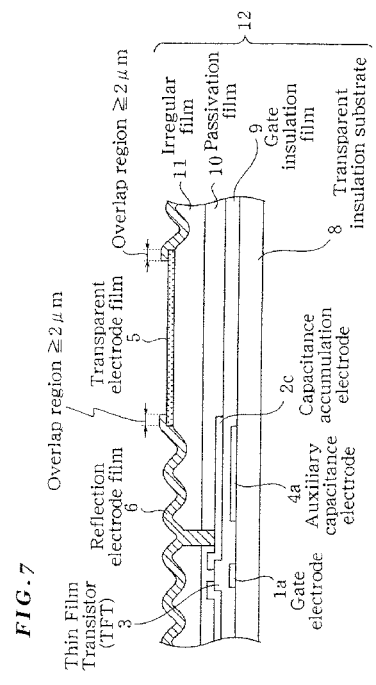
FIG. 7 is a cross-sectional view for showing the configuration of the transflective type LCD related to the second embodiment of the present invention.

The following will describe the transflective type LCD related to the second embodiment of the present invention with reference to FIGS. 6 and 7. The present embodiment features that to suppress a reaction between the transparent electrode film made of ITO etc. and the reflection electrode film made of Al/Mo etc., the positional relationship these electrode films is regulated.

The transflective type LCD 12 of the present embodiment comprises the active matrix substrate 12, the opposing substrate 16, and the liquid crystal layer 17 sandwiched by these substrates in such a configuration that on the outer sides of the active matrix substrate 12 and the opposing substrate 16 are respectively arranged the λ/4 plates and the polarizing plates at the above-mentioned arrangement angle with respect to the optical axis. As the liquid crystal can be employed, for example, nematic liquid crystal NR523LA (Δn=0.086) made by Chisso Corp. with the above-mentioned settings of the gap value at 2.7 μm and the twist angle at 72°. The opposing substrate is further comprised of a color filter and an opposing electrode for supplying a reference potential.

As shown in FIGS. 6 and 7, on the active matrix substrate 12 are arranged the gate line 1 for supplying a scanning signal, the common storage line 4 which gives capacitance, the auxiliary capacitance electrode 4a, the data line 2 for supplying an image signal, the TFT 3 connected as a switching element to an intersection of these, and a pixel electrodes arranged in matrix at each of the transistors. To the gate electrode 1a of the TFT 3 is connected the gate line 1 and, to its drain electrode is connected the data line 2.

Further, to protect the TFT 3 the passivation film 10 is formed thereon, on which is in turn formed the irregular layer 11 made of photo-sensitive acrylic resin which underlies the irregularities of the reflection electrode film 6. On this is further formed the transparent electrode film 5 composed of a transparent conductive film made of ITO etc., on which is formed the reflection electrode film 6 made of high-reflectivity metal such as Al.

Note here that, as mentioned above, in the prior application of the present inventor (see FIGS. 16 and 17), the transparent electrode film 5 and the reflection electrode film 6 are separated from each other in a region between the adjacent pixels, in which region of the transparent electrode film 5 is eroded at its edge when the reflection electrode film 6 is patterned, thus giving a defective pixel in some cases.

To suppress this electric erosion reaction between the reflection electrode film 6 and the transparent electrode film 5, the present patent application employs a variety of countermeasures. One is to adjust the positional relationship between the reflection electrode film 6 and the transparent electrode film 5. Specifically, as shown in FIG. 6, a window portion which provides a transmission region is formed in the reflection electrode film 6 in each of the pixels to thereby set a positional relationship between the reflection electrode film 6 and the transparent electrode film 5 so that these two films may overlap with each other around the overall periphery of this window portion.

That is, one cause of erosion is considered as follows: at the edge of the transparent electrode film 5 the reflection electrode film 6 deposited thereon has poor coverage due to a crack etc., through which a developer soaks into the poor coverage portion when forming a resist pattern for reflection electrode film 6. To guard against this, a predetermined overlap region is provided between the transparent electrode film 5 and the reflection electrode film 6 to cover the edge of the transparent electrode film 5 with a resist pattern in order to prevent the developer from coming in direct contact therewith, thus avoiding erosion of the transparent electrode film 5. Note here that an extent of the overlapping should be enough only to cover the poor coverage portion, which is specifically 2 μm or so as confirmed experimentally by the present inventor.

Furthermore, by forming the reflection electrode film 6 in such a manner that it may overlap with the transparent electrode film 5 around its overall periphery, an area in which these two films 5 and 6 come in contact with each other can be increased advantageously. That is, in a case of the reflection region is formed on the side of the TFT 3, the source electrode of the TFT 3 and the reflection electrode film 6 can be interconnected via a contact hole 7 formed through the irregular layer 11 and the passivation film 10 to connect the transparent electrode film 5 to the reflection electrode film 6 in order to thereby interconnect the source electrode and the transparent electrode film 5, so that contact resistance between the transparent electrode film 5 and the reflection electrode film 6 can be decreased by forming these two films in such a manner that they may overlap with each other around the overall periphery. Moreover, by connecting the transparent electrode film 5 around its overall periphery, such an effect can be expected as to provide a uniform potential everywhere on the transparent electrode film 5, thus accurately controlling a voltage applied on the liquid crystal.

Although the present embodiment has been described with reference to a configuration in which one rectangular window portion is formed in the reflection electrode film 6, the present invention is not limited thereto; for example, the window portion may be polygonal, circular, elliptical, or of any other arbitrary shape and be provided more than one in each pixel, as far as the reflection electrode film 6 overlaps with the transparent electrode film 5 around its overall periphery. Furthermore, although in FIG. 7 the irregular film 11 is shaped irregular in the reflection region and flat in the transmission region, it may be formed irregular in both of the regions 5 and 6 as shown in FIG. 2 and their surfaces may be of an arbitrary shape.

Third Embodiment

Figure 8A:
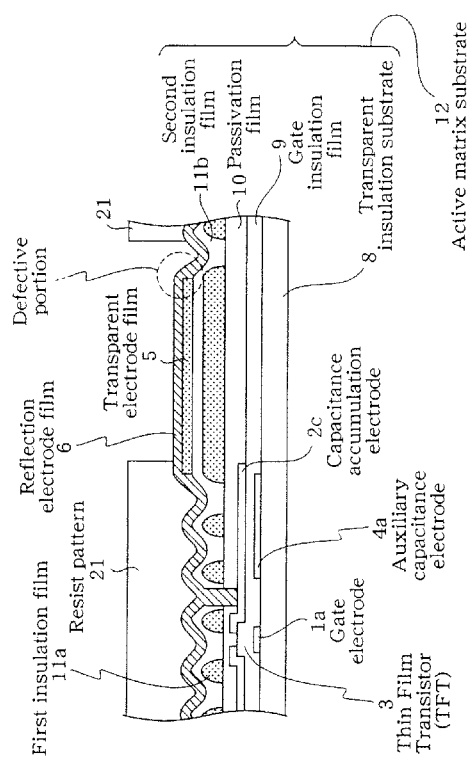
FIG. 8 are cross-sectional views for showing a problem of a conventional transflective type LCD.
Figure 8B:
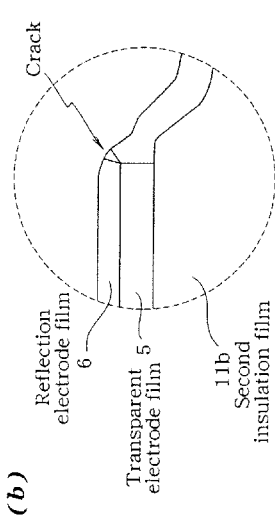
Figure 8C:
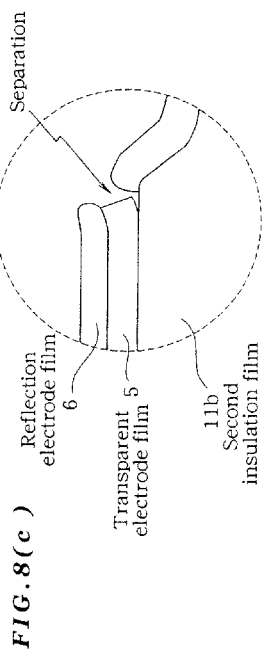
Figure 9:
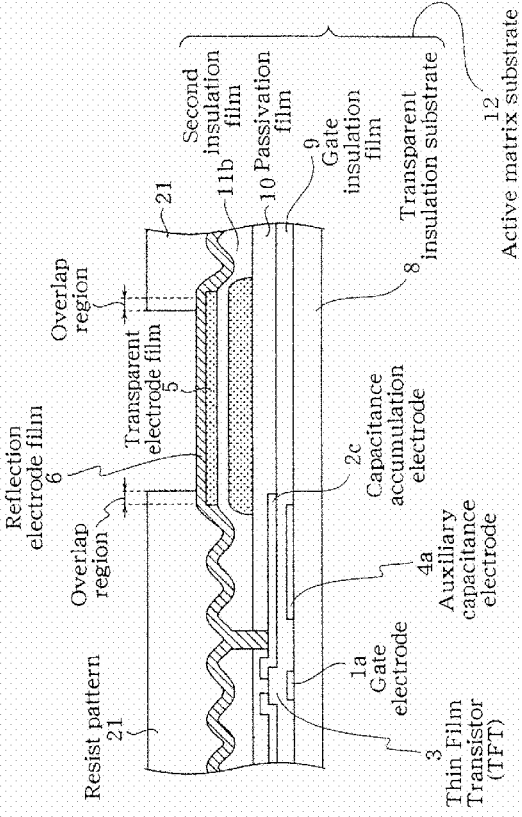
FIG. 9 is a cross-sectional view for showing an effect of the transflective type LCD related to a third embodiment of the present invention.
Figure 10:
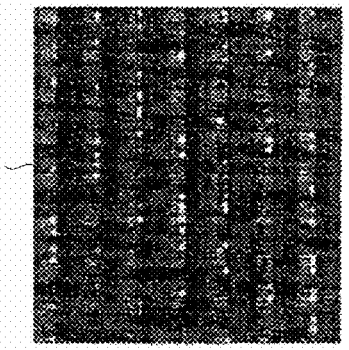
FIG. 10 is a microscopic picture for showing abnormal display of the conventional transflective type LCD.

The following will describe a transflective type LCD manufacturing method related to the third embodiment of the present invention with reference to FIGS. 8-10. Here, FIGS. 8-10 are drawings for explaining problems in production process of the active matrix substrate. Note here that the present embodiment features that the electric erosion reaction is suppressed from occurring between the transparent electrode film and the reflection electrode film.

In the above-mentioned second embodiment, as shown in FIG. 8B (expanded view of a defective portion of FIG. 8A), a problem that a developer soaks into the reflection electrode film 6 through its crack at the edge of the transparent electrode film 5 during a PR process for processing of the reflection electrode film 6 is solved by adjusting the planar positional relationship between the reflection electrode film 6 and the transparent electrode film 5. To suppress electric erosion from occurring between the reflection electrode film 6 and the transparent electrode film 5 more securely, it is necessary to improve adhesiveness of the transparent electrode film 5 to improve the coverage of the reflection electrode film 6 in an area of the edge of the transparent electrode film 5. In view of this, the present embodiment features a method of adjusting the thickness of the reflection electrode and optimizing a cleaning step before the transparent electrode film 5 is formed to thereby suppress electric erosion from occurring between the reflection electrode film 6 and the transparent electrode film 5. The following will describe a mechanism of and how to suppress electric erosion from occurring between the ITO substrate of the transparent electrode film 5 and the Al substrate of the reflection electrode film 6.

(1) Mechanism of ITO-Al Electric Erosion

Combination is very bad between an Al-based material, which is highly reactive and easily reacts with oxygen to form an oxide film ($Al_2O_3$), and ITO, which is an oxide conductor. Particularly when forming a positive resist pattern on a layered film consisting of an upper layer made of Al and a lower layer made of ITO, so-called electric erosion occurs to erode (oxidize) Al and dissolve (reduce) ITO, thus giving poor contact between Al and ITO (see FIG. 8B). This electric erosion reaction is considered to occur by the following mechanism.

1. Such an Al portion as to have many lattice defects or impurities dissolves as a local anode, thus giving rise to a pin hole;

2. Through thus formed pin hole, a developer comes in contact with the underlying ITO;

3. A potential difference between an oxidizing potential of Al in the developer and a reducing potential of ITO triggers the reaction, thus promoting oxidization of Al and reduction of ITO respectively indicated by the following reaction formulae:

$$Al + 4OH^- \rightarrow H_2AlO_3 + H_2O + 3e \tag{1}$$

$$In_2O_3 + 3H_2O + 6e \rightarrow 2In + 6OH^- \tag{2}$$

(2) Film Thickness of Mo as Barrier Metal

The above-mentioned phenomenon of electric erosion occurring between the Al and ITO substances can be suppressed to some extent by inserting Mo etc. as the barrier metal between these substances. However, the Al and Mo substances deposited by sputtering are generally columnar crystal, so that a developer soaks into them through a gap between the columns to touch off electric erosion if Al and Mo do not have sufficient film thickness. As such, the present inventor investigated an extent to which the electric erosion reaction occurs when the film thickness of Al and Mo formed on the ITO are changed respectively. A correlation between these is given in a table below. In the table, X indicates significant occurrence of electric erosion, Δ indicates partial occurrence, ○ indicates almost no occurrence, and ⊚ indicates no occurrence.

TABLE 1

| Mo film thickness | Al film thickness | Electric erosion |
|---|---|---|
| 50 nm (500 A) | 50 nm | X |
|  | 100 nm | X |
|  | 200 nm | X |
| 100 nm | 50 nm | X |
|  | 100 nm | Δ |
|  | 200 nm | ○ |
| 200 nm | 50 nm | X |
|  | 100 nm | Δ |
|  | 200 nm | ○ |
| 100 nm twice | 50 nm | X |
|  | 100 nm | Δ |
|  | 200 nm | ◎ |
|  | 100 nm twice | ◎ |

Table 1 indicates that to suppress electric erosion from occurring, it is necessary to form both Mo and Al films to a film thickness of 100 nm (1000 Å) or more, preferably 200 nm or more. Furthermore, it was found that when forming the Mo and Al films, rather than forming them, for example, to a thickness of 200 nm at a time, preferably they are formed to a thickness of 100 nm, then washed with an alkali solution once, and then formed to another thickness of 200 nm, in order to improve their performance as a barrier. Although not clear, the reason may be that the surface of Mo dissolves by alkali washing and is reduced in columnar-ness, so that when once exposed to the air or the washing solution, the Mo surface has a thin film formed thereon and, when formed second time, is changed in crystallinity.

(3) Adhesiveness of ITO on Irregular (Organic) Film

Paragraphs (1) and (2) have described how to improve the performance of barrier metal. No matter how the barrier metal performance is improved, however, unless the transparent electrode film 5 made of ITO is patterned with good adhesiveness on the underlying irregular film 11, the developer soaks through a gap into the reflection electrode film 6 to give rise to electric erosion as shown in FIG. 8C.

Generally, prior to sputtering of the ITO, ultra-violet (UV) ray is applied to decomposes an organic substance such as oil and then pure water or a weak alkali solution is used for washing, a step of which washing was experimentally confirmed by the present inventor to have an influence on the adhesiveness of the ITO. Table 2 below shows a correlation between electric erosion and an application quantity of UV ray prior to ITO sputtering. In the experiment, UV ray with a wavelength of 300 nm was applied with a quantity of 0 mJ through 1 J.

TABLE 2

| UV application quantity | Electric Erosion |
|---|---|
| 0 mJ | ○ |
| 100 mJ | Δ |
| 250 mJ | X |
| 500 mJ | X |
| 1 J | X |

Table 2 indicates that electric reaction is liable to occur at a quantity of 100 mJ or more of UV ray application. A mechanism for that is considered as follows: a polymer network on the surface of the irregular film 11 made of an organic substance such as acrylic is destroyed by UV ray and, when an ITO film is formed thereon and patterned by photolithography (PR), the surface of the irregular film 11 on which the polymer network is destroyed dissolves in an etch-off solution during an etch-off step, thus causing the edge of the ITO to lift.

When the ITO is thus peeled, a lift cannot completely be covered by barrier metal, if provided to the reflection electrode film 6. Especially in such a configuration of FIG. 8 that the reflection electrode film 6 is not overlapped at the edge of the ITO, a resist pattern 21 used for processing of the reflection electrode film does not cover the edge of the ITO, so that a developer soaks through a gap between the electrodes during a developing step, thus giving rise to electric erosion as confirmed by the experiment.

In contrast, in such a configuration of the present embodiment that the edge of the ITO is totally covered by the reflection electrode film 6 as shown in FIG. 9, the resist pattern used to etch the reflection electrode film 6 also covers the edge of the ITO to thereby block the developer, thus preventing it from disadvantageously soaking through during the developing step.

Thus, at the washing step prior to ITO sputtering, by limiting the application quantity of UV ray down to 100 mJ or less or even by eliminating the UV ray application step and also by setting the film thickness of both the barrier metal and Al films of the reflection electrode film 6 at 100 nm or more, preferably 200 nm or more, it is possible to efficiently suppress electric erosion between the ITO and Al substances, thus preventing the conventional dissolving of ITO and Al (see a microscopic picture of FIG. 10).

Although the above-mentioned embodiments have employed Mo as the barrier metal of the reflection electrode film 6, the barrier metal is not limited to it but may be Cr, Ti, W, etc. instead. Also, although the film thickness of the Al and Mo substances have been set at 100 nm or more, preferably 200 nm or more, the optimal film thickness may be adjusted appropriately corresponding to the film formation conditions including sputtering etc.

Fourth Embodiment

Figure 12A:
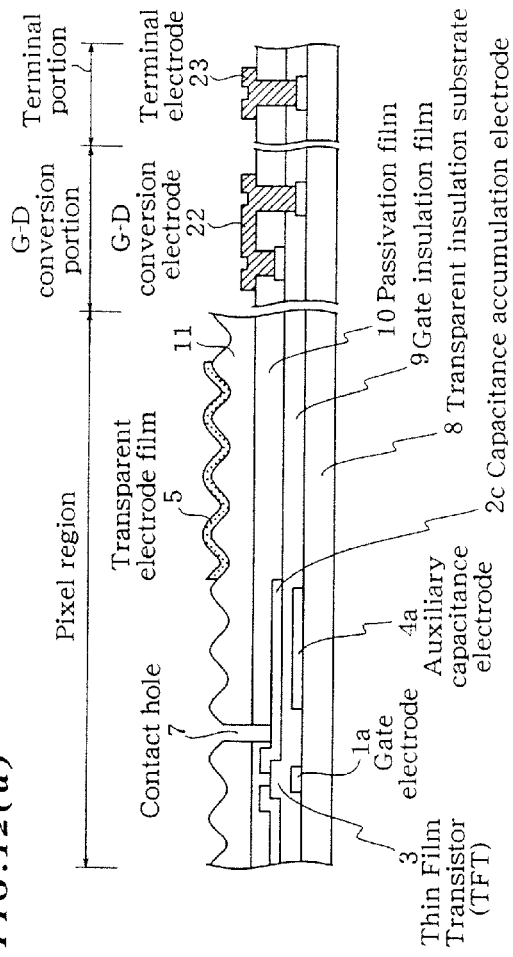
FIG. 12 are cross-sectional flow diagrams for showing the transflective type LCD manufacturing method related to the fourth embodiment of the present invention.
Figure 12B:
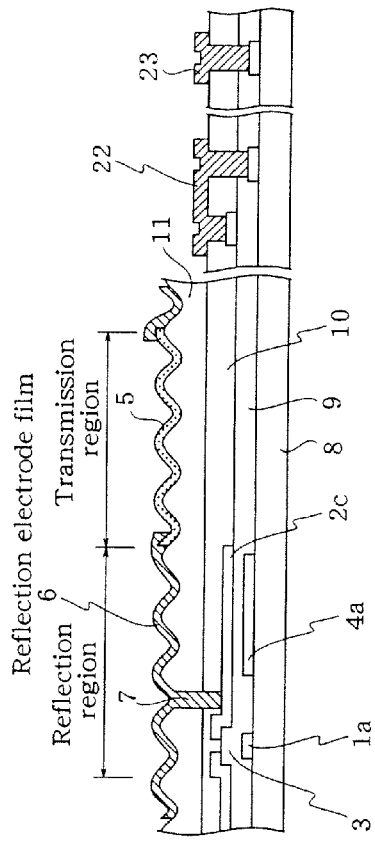
Figure 13A:
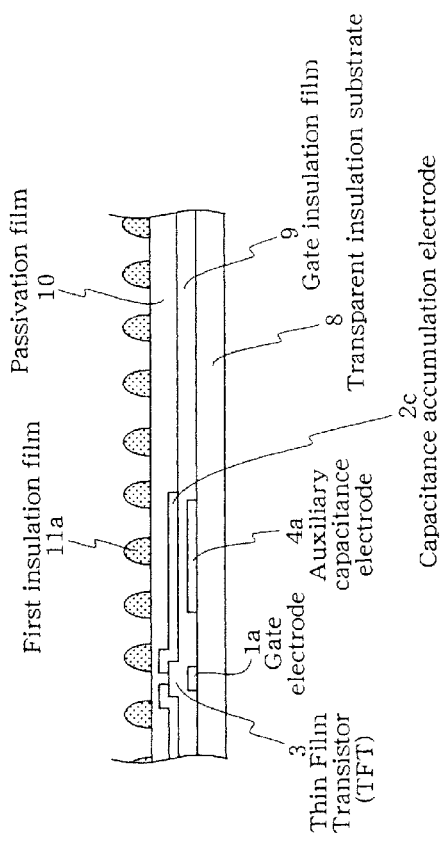
FIG. 13 are the cross-sectional flow diagrams for showing the transflective type LCD manufacturing method related to the fourth embodiment of the present invention.
Figure 13B:
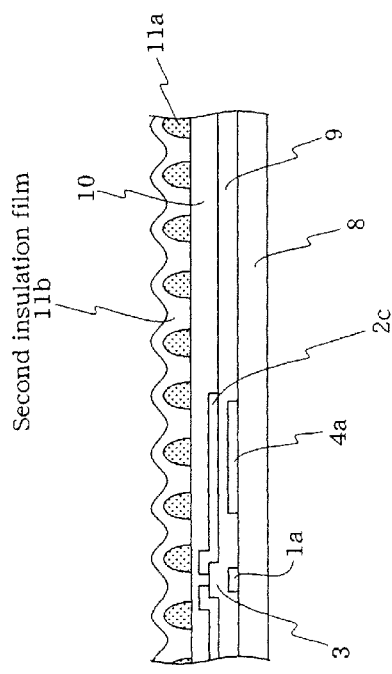

The following will describe the transflective LCD manufacturing method according to the fourth embodiment of the present invention with reference to FIGS. 11-13. FIG. 11 and FIG. 12 are cross-sectional flow diagrams for showing a transflective type LCD manufacturing method related to a fourth embodiment of the present invention, and FIG. 13 are the cross-sectional flow diagrams for showing the method for forming the irregularity film. The present embodiment gives a specific manufacturing method which enables G-D conversion to prevent short-circuiting of a leader wiring owing to a conductive seal in addition to taking into account the conditions described with the above-mentioned embodiments. The method is described with reference to these figures.

First, as shown in FIG. 11A, metal such as Cr is deposited on the transparent insulation substrate 8 made of glass and patterned with publicly known photolithography and etching technologies to form the gate line, the gate electrode 1*a*, the common storage line, and the auxiliary capacitance electrode 4*a*. Then, a semiconductor layer made of a-Si etc. is deposited via the gate insulation layer film 9 made of $SiO_2$, SiNx, SiON, etc. and patterned into islands, on which metal such as Cr is in turn deposited and patterned to form the data line, the drain electrode 2*a*, the source electrode 2*b*, and the capacitance accumulation electrode 2*c*.

Next, as shown in FIG. 11B, the passivation film 10 made of SiNx etc. for protecting the TFT 3 is formed with plasma-enhanced CVD, after which the gate insulation film 9 and the passivation film 10 at the G-D conversion portion and the terminal portions are partially removed to form a contact hole. Then, a conductive material made of ITO, Al, etc. is deposited to form a terminal electrode 23 and a G-D conversion electrode 22 for interconnecting the drain and gate layers at the G-D conversion portion.

Next, as shown in FIG. 11C, to form irregularities of the reflection electrode film 6 on the passivation film 10 to improve visibility of reflection light, an irregular film 11 is formed. This irregular film 11 is formed by applying photo-sensitive acrylic resin, for example, PC403, 415G, 405G, etc. made by JSR Co. using spin coating. Furthermore, the photo-sensitive acrylic resin is under-exposed with a little smaller quantity of exposure in an expected recess region of the irregularities, not exposed on an expected protrusion region of them, and exposed with a sufficient quantity of exposure in the expected contact hole region.

To enable such exposure, a half-tone (gray tone) mask can be used on which a reflection film is formed at a portion which corresponds to the expected protrusion region, a transmission mask is formed at a portion which corresponds to the expected contact hole region, and a transflective film is formed at a portion which corresponds to the expected recess region, thus requiring exposing only once to form the irregularities. In this case, even an ordinary mask comprised of only reflection/transmission films can be used to form the irregularities by exposing the expected contact hole and recess regions separately with different exposure quantities.

Next, an alkali developer is used to form the irregularities by utilizing a difference in dissolving rate in an alkali solution of the expected recess, protrusion, and contact hole regions. Note here that by the present invention, in order to form the irregular film 11 even in the transmission region, the acrylic film is decolorized by exposing the overall surface to suppress transmission light from being attenuated by the irregular mask 11. Then, the surface is cured, for example, at 220° C. for one hour to form the irregular film 11 having a desired shape.

Although as mentioned above this irregular mask 11 may be formed by forming one layer of photo-sensitive acrylic resin and then changing an exposure quantity partially, it may be formed using a plurality of photo-sensitive acrylic resin. For example, as shown in FIG. 13A, desired irregularities can be formed by forming first layer of photo-sensitive acrylic resin in a shape of islands, then heat treating it to form the first insulation film 11a, then applying thereon the second insulation film 11b made of photo-sensitive acrylic resin having a predetermined value of viscosity, and then filling the gap between the islands of the first insulation film 11a.

Next, as shown in FIG. 12A, a transparent conductive film made of ITO etc. is formed by sputtering, in which step preferably a UV application quantity is 100 mJ or less as described with the third embodiment. Then, thus formed ITO is patterned into a predetermined shape to form the transparent electrode film 5 in the transmission region.

Next, as shown in FIG. 12B, Mo is used as barrier metal to suppress electric erosion between ITO and Al of the reflection electrode, to form Mo and Al films which act as the barrier metal and the reflection metal respectively. In this case, as described with the third embodiment, the Mo and Al films are formed to a thickness of 100 nm or more, preferably 200 nm or more and also in two steps to suppress the columnar crystal from growing by sputtering. Then, the Al/Mo films are collectively wet-etched to pattern the reflection electrode film 6. In this case, as described with the second embodiment, to suppress the ITO edge from being etched off by the developer, preferably the positional relationship of the Al/Mo films is set so that they may overlap with each other around the overall periphery of the ITO.

Thus, this method of manufacturing the active matrix substrate makes it possible to obtain a transflective type LCD in which the peeling of the transparent electrode film 5 and the electric erosion between the transparent electrode film 5 and the reflection electrode film 6 can be suppressed to prevent occurrence of a defective pixel and also G-D conversion is conducted around the outer periphery of the liquid crystal panel.

Fifth Embodiment

The following will describe the transflective type LCD and method for manufacturing the same related to the fifth embodiment of the present invention with reference to FIGS. 14 and 15. FIGS. 14 and 15 are cross-sectional flow diagrams for showing the transflective type LCD manufacturing method related to a fifth embodiment of the present invention. The present embodiment has simplified the manufacturing method as compared to the fourth embodiment. The method is described below with reference to these figures.

Figure 14A:
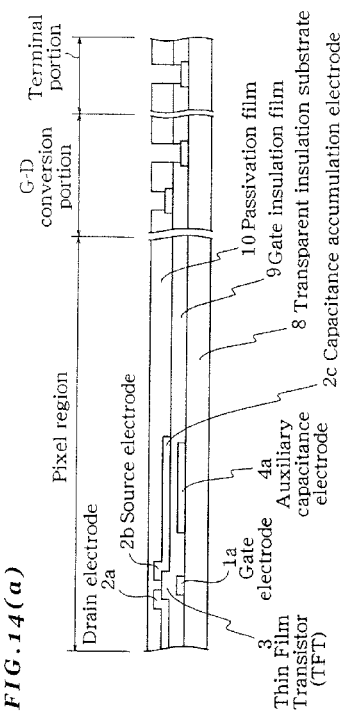
FIG. 14 are cross-sectional flow diagrams for showing the transflective type LCD manufacturing method related to a fifth embodiment of the present invention.

First, as by the above-mentioned fourth embodiment, as shown in FIG. 14A, on a transparent insulation substrate made of glass are sequentially formed the gate line, the gate electrode 1a, the common storage line, and the auxiliary capacitance electrode 4a, on which are sequentially formed the gate insulation film 9, the semiconductor layer, the data line, the drain electrode, the source electrode, and the capacitance accumulation electrode 2c. Then, after the passivation film 10 which protects the TFT 3 is formed, the gate insulation film 9 and the passivation film 10 at the G-D conversion portion and the terminal portion are etched off to form a contact hole.

In contrast to the fourth embodiment in which after the contact hole is formed, the conductive materials such as ITO, Al, etc. for G-D conversion are formed as a film and patterned, the present embodiment simplifies the manufacturing steps by using the transparent electrode film 5 and the reflection electrode film 6 which are formed in the subsequent steps, to interconnect the drain and gate layers of the G-D conversion portion and form the terminal electrode.

Figure 14B:
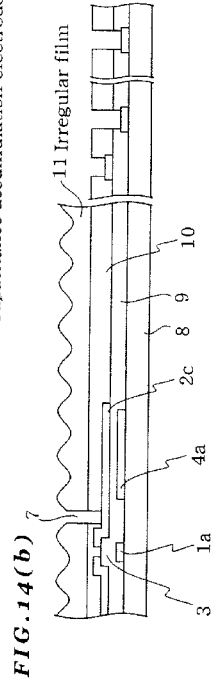

Next, as shown in FIG. 14B, the irregular film 11 is formed to form irregularities of the reflection electrode film 6. For example, the photo-sensitive acrylic resin is under-exposed with a little smaller quantity of exposure in an expected recess region of the irregularities, not exposed on an expected protrusion region of them, and exposed with a sufficient quantity of exposure in the expected contact hole 7 region. Then, an alkali developer is used to form the irregularities by utilizing a difference in dissolving rate in an alkali solution of these regions. Then, the surface is thoroughly exposed to decolorize the acrylic film and cured, for example, at 220° C. for one hour to form the irregular film 11.

Figure 14C:
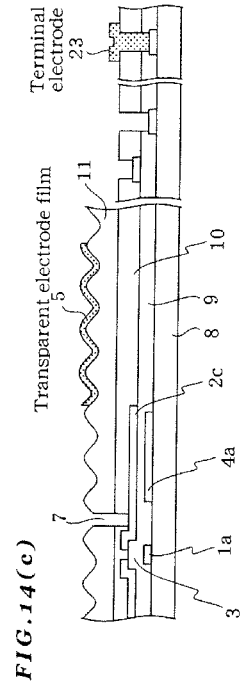

Next, after the surface is washed under the conditions of a UV application quantity being 100 mJ or less, as shown in FIG. 14C, a transparent conductive film made of ITO etc. is formed by sputtering and patterned to form the transparent electrode film 5 in the transmission region. At the same time, ITO is formed also at the terminal portion to form the terminal electrode 23.

Figure 14D:
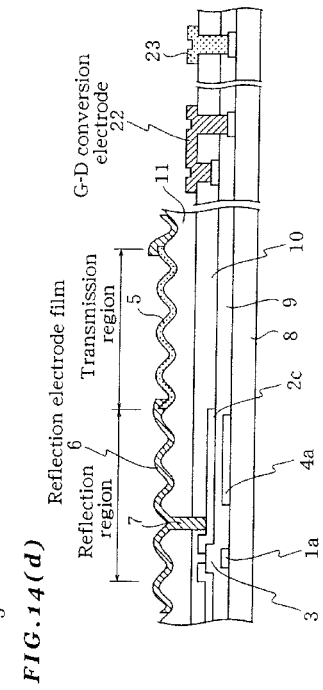

Next, as shown in FIG. 14D, a Mo film with a film thickness of 100 nm or more, preferably 200 nm or more, and an Al film with a film thickness of 100 nm or more, preferably 200 nm or more, are formed consecutively. Then, the Al/Mo films are wet-etched collectively to pattern the reflection electrode film 6. At the same time, Al/Mo films are formed also at the G-D conversion portion to interconnect its drain and source layers.

Thus, by the above-mentioned manufacturing method, the layers of the G-D conversion portion are interconnected using the reflection electrode film 6 and the terminal electrode 23 is formed using the transparent electrode film 5, so that it is possible to eliminate the step of forming and patterning the ITO film for G-D conversion etc. in contrast to the fourth embodiment.

Although the present embodiment deposits the reflection electrode film 6 in the contact hole 7 to connect it with the source electrode and then with the transparent electrode film 5 at the overlapping portion thereof, the contact may not be enough only with the reflection electrode film 6 in some cases because the irregular film 11 in which the contact hole 7 is formed has a large step. To secure the contact, the following manufacturing method may be employed.

Figure 15A:
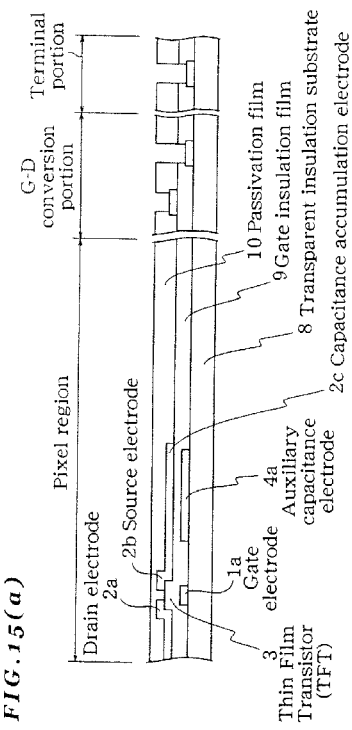
FIG. 15 are the cross-sectional flow diagrams for showing the transflective type LCD manufacturing method related to a fifth embodiment of the present invention.

First, as shown in FIG. 15A, on the transparent insulation substrate 8 are sequentially formed the gate line, the gate electrode 1a, the auxiliary capacitance electrode 4a, the gate insulation film 9, the semiconductor layer, the data line, the drain electrode 2a, the source electrode 2b, and the capacitance accumulation electrode 2c. Then, after the passivation film 10 which protects the TFT 3 is formed, the gate insulation film 9 and the passivation film 10 at the G-D conversion portion and the terminal portion are etched off to form the contact hole.

Figure 15B:
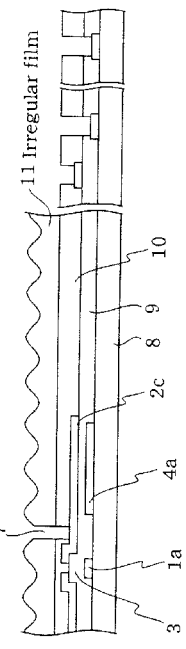

Next, as shown in FIG. 15B, the irregular film 11 is formed to form irregularities of a reflection plate. For example, the photo-sensitive acrylic resin is under-exposed with a little smaller quantity of exposure in an expected recess region of the irregularities, not exposed on an expected protrusion region of them, and exposed with a sufficient quantity of exposure in the expected contact hole region and then, an alkali developer is used to form the irregularities by utilizing a difference in dissolving rate in an alkali solution of these regions. Then, the surface is thoroughly exposed to decolorize the acrylic film and cured, for example, at 220° C. for one hour to form the irregular film 11.

Figure 15C:
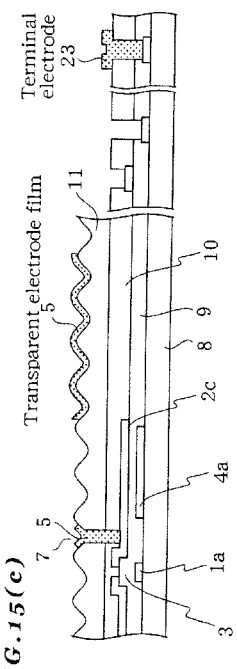

Next, after the surface is washed under the conditions of a UV application quantity being 100 mJ or less, as shown in FIG. 15C, a transparent conductive film made of ITO etc. is formed by sputtering and patterned to form the transparent electrode film 5 in the transmission region and the terminal electrode 23 as well. At the same time, ITO is deposited also in the contact hole 7 to fill with it completely or partially.

Figure 15D:
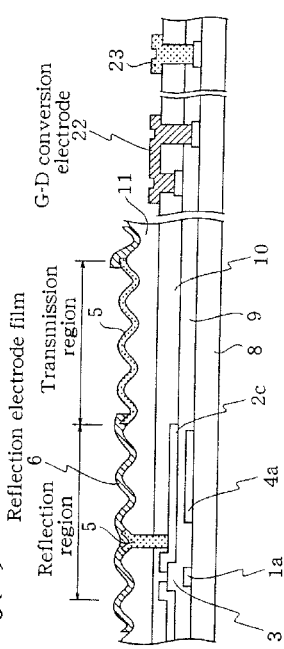

Next, as shown in FIG. 15D, the Mo film and the reflecting Al metal film each having a film thickness of 100 nm or more, preferably 200 nm or more, are formed consecutively. Then, the Al/Mo films are wet-etched collectively to pattern the reflection electrode film 6. At the same time, the reflection electrode film 6 is formed also at the G-D conversion portion to interconnect its drain and source layers. In this case, the transparent electrode film 5 is already deposited in the contact hole 7, so that even if the contact hole 7 has a large aspect ratio, secure contact can be obtained between the source electrode and the reflection electrode film 6.

Thus, by the above-mentioned manufacturing method, the contact hole provided on the source electrode 2c of the TFT3 continues electrically to the reflection electrode film 6 and the transparent electrode film 5 in this order, so that contact can be secured even if the irregular film 11 is thick and the contact hole 7 has a large aspect ratio.

As mentioned above, the transflective type LCD and method for manufacturing the same according to the present invention has the following effects.

As the first effect of the present invention, for example, the V-T characteristics of the transmission mode can agree with those of the reflection mode to thereby improve a display quality.

The reason is that the irregular film is formed almost in the same shape everywhere on the surface of the pixel region to thereby provide almost the same gap in both the reflection region and the transmission region mode.

As the second effect, it is possible to suppress electric erosion from occurring between the transparent electrode film made of ITO etc. and the reflection electrode film made of Al etc. to thereby prevent occurrence of abnormal display.

The reason is that the reflection electrode film is formed in configuration all around the edge of the ITO film to cover the edge with a resist for processing the reflection electrode film when the resist is formed, thus preventing the developer from coming in contact therewith.

Furthermore, by using Mo as the barrier metal of the reflection electrode film and setting the film thickness of the Mo and Al films at a predetermined value or more and also limiting the UV application quantity at the washing step prior to formation of the ITO film down to a predetermined value or less, the close contact-ness of the ITO film is improved to prevent the etchant or the developer from soaking through.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-237887 (Filed on Aug. 6, 2001) including specification, claims, drawings and summary are incorporated herein by reference in its entirety.

What is claimed is:

1. A method for manufacturing a transflective type LCD having a first substrate provided thereon with a plurality of scanning lines and a plurality of signal lines which are substantially perpendicular to each other and a switching element arranged near each of intersections between said scanning lines and said signal lines, comprising:
   forming a reflection region having a reflection electrode film and a transmission region having a transparent electrode film in each pixel surrounded by said scanning lines and said signal lines, a liquid crystal being sandwiched at a gap between said first substrate and a second substrate which is arranged opposite to said first substrate; and
   forming an organic film having irregularities thereon below said reflection electrode film and said transparent electrode film to substantially the same film thickness, comprising:
      forming a first organic film as scattered in dot;
      performing predetermined heat treatment to form protrusions; and
      covering moderately by a second organic film to form said predetermined irregularities.

* * * * *